(12) United States Patent
Tajika et al.

(10) Patent No.: US 11,390,788 B2
(45) Date of Patent: Jul. 19, 2022

(54) CHEMICAL HEAT STORAGE MATERIAL AND METHOD FOR PRODUCING SAME

(71) Applicants: SHIRAISHI CENTRAL LABORATORIES CO., LTD., Hyogo (JP); TOKYO INSTITUTE OF TECHNOLOGY, Tokyo (JP)

(72) Inventors: Masahiko Tajika, Amagasaki (JP); Yukitaka Kato, Tokyo (JP); Naoto Uchiyama, Tokyo (JP); Hiroki Takasu, Tokyo (JP)

(73) Assignees: SHIRAISHI CENTRAL LABORATORIES CO., LTD., Amagasaki (JP); TOKYO INSTITUTE OF TECHNOLOGY, Tokyo (JP)

( * ) Notice: Subject to any disclaimer, the term of this patent is extended or adjusted under 35 U.S.C. 154(b) by 0 days.

(21) Appl. No.: 17/043,097

(22) PCT Filed: Mar. 12, 2019

(86) PCT No.: PCT/JP2019/009873
§ 371 (c)(1),
(2) Date: Sep. 29, 2020

(87) PCT Pub. No.: WO2019/193936
PCT Pub. Date: Oct. 10, 2019

(65) Prior Publication Data
US 2021/0024805 A1 Jan. 28, 2021

(30) Foreign Application Priority Data
Apr. 2, 2018 (JP) .............................. JP2018-070795

(51) Int. Cl.
*C09K 5/16* (2006.01)
*C01F 11/06* (2006.01)

(52) U.S. Cl.
CPC ................ *C09K 5/16* (2013.01); *C01F 11/06* (2013.01)

(58) Field of Classification Search
CPC ... C09K 5/14; C09K 5/16; C01F 11/02; C01F 11/04; C01F 11/06
See application file for complete search history.

(56) References Cited

U.S. PATENT DOCUMENTS 7,618,606 B2 * 11/2009 Fan .......................... C01F 11/06
423/230
2006/0093540 A1 5/2006 Fan et al.
(Continued)

FOREIGN PATENT DOCUMENTS

CN 103429972 A 12/2013
EP 3 061 799 A1 8/2016
(Continued)

OTHER PUBLICATIONS

Borgwardt ("Calcination kinetics and surface area of dispersed limestone particles," AIChE Journal, vol. 31, No. 1, 1985, pp. 103-111) (Year: 1985).*
(Continued)

*Primary Examiner* — Matthew R Diaz
(74) *Attorney, Agent, or Firm* — WHDA, LLP (57) ABSTRACT

Provided are a chemical heat storage material having excellent cyclic durability and a method for producing the same. A chemical heat storage material includes: a surface layer formed of silica and/or calcium silicate; and calcium oxide particles with the surface layer.

12 Claims, 10 Drawing Sheets

(56) References Cited

U.S. PATENT DOCUMENTS

| | | | |
|---|---|---|---|
| 2014/0053582 A1* | 2/2014 | Bolin | C09K 5/16 62/112 |
| 2016/0251559 A1 | 9/2016 | Bolin et al. | |
| 2018/0072934 A1 | 3/2018 | Kono et al. | |
| 2018/0106508 A1 | 4/2018 | Bolin et al. | |

FOREIGN PATENT DOCUMENTS

| | | | | |
|---|---|---|---|---|
| JP | 58-151321 A | | 9/1983 | |
| JP | 2009-133590 A | | 6/2009 | |
| JP | 2014-514135 A | | 6/2014 | |
| JP | 2016-190990 A | | 11/2016 | |
| JP | 2018-59016 A | | 4/2018 | |
| JP | 2018-123217 A | | 8/2018 | |
| WO | WO-2009144472 A2 * | 12/2009 | | B01D 53/02 |

OTHER PUBLICATIONS

International Search Report dated Apr. 9, 2019, issued in counterpart International Application No. PCT/JP2019/009873 (2 pages).

Office Action dated Jun. 3, 2021, issued in counterpart CN Application No. 201980022976.X. (6 pages).

Notification of Transmittal of Translation of the International Preliminary Report on Patentability (Form PCT/IB/338) issued in counterpart International Application No. PCT/JP2019/009873 dated Oct. 15, 2020 with Forms PCT/IB/373 and PCT/ISA/237. (8 pages).

Extended (Supplementary)European Search Report dated Nov. 29, 2021, issued in counterpart EP Application No. 19782062.4 (7 pages).

Office Action dated Mar. 3, 2022, issued in counterpart CN Application No. 201980022976.X, with English Translation. (9 pages).

* cited by examiner

CHEMICAL HEAT STORAGE MATERIAL AND METHOD FOR PRODUCING SAME

TECHNICAL FIELD

The present invention relates to chemical heat storage materials that perform reversible reaction between exothermic hydration and endothermic dehydration, and the methods for producing the same.

BACKGROUND ART

A chemical heat pump is an effective means as a system for recovering and reusing unutilized thermal energy. The chemical heat pump using a chemical heat storage material uses reversible reaction between exothermic hydration and endothermic dehydration to store and release heat. For example, a calcium oxide/water-based chemical heat pump can release heat evolved when calcium oxide in a chemical heat storage material becomes hydrated, and can store heat in the chemical heat storage material by heating and dehydrating calcium hydroxide generated by the hydration of calcium oxide.

Patent Literature 1 proposes, as a chemical heat storage material having high strength and thermal conductivity in a pelletized state, a chemical heat storage material containing calcium oxide or like component, a boron compound, and a silicone polymer.

CITATION LIST

Patent Literature

Patent Literature 1: JP-A-2016-190990

SUMMARY OF INVENTION

Technical Problem

However, conventional chemical heat storage materials have a problem that when heat storage by dehydration reaction and heat generation by hydration reaction are repeated, they gradually reduce the amount of heat storage and the amount of heat generation and are therefore poor in cyclic durability.

An object of the present invention is to provide a chemical heat storage material having excellent cyclic durability and a method for producing the same.

Solution to Problem

A chemical heat storage material according to the present invention comprises: a surface layer formed of silica and/or calcium silicate; and calcium oxide particles with the surface layer.

The chemical heat storage material according to the present invention preferably has a silicon equivalent content of 0.1 to 10% by mass.

The chemical heat storage material according to the present invention preferably has a calcium atom-equivalent content of 56 to 71% by mass.

A production method according to the present invention is a method that enables production of the chemical heat storage material according to the present invention and includes the steps of: preparing surface-treated calcium carbonate in which calcium carbonate has a coated layer serving as a source of silica on a surface thereof; and firing the surface-treated calcium carbonate to convert calcium carbonate to calcium oxide.

In the production method according to the present invention, the coated layer is preferably formed using at least one selected from the group consisting of silica hydrosol, silane coupling agent, silica powder, and alkoxide silane.

In the production method according to the present invention, calcium carbonate before being surface treated preferably has an average particle diameter within a range of 10 to 300 nm.

In the production method according to the present invention, calcium carbonate before being surface treated preferably has a BET specific surface area within a range of 5 to 120 $m^2/g$.

In the production method according to the present invention, a temperature during the firing is preferably within a range of 600 to 100° C.

Advantageous Effects of Invention

According to the present invention, the cyclic durability of the chemical heat storage material can be increased.

DESCRIPTION OF EMBODIMENTS

Hereinafter, a description will be given of a preferred embodiment. However, the following embodiment is merely illustrative and the present invention is not limited to the following embodiment.

<Chemical Heat Storage Material>

A chemical heat storage material according to the present invention comprises: a surface layer formed of silica and/or calcium silicate; and calcium oxide particles with the surface layer.

The surface layer may be formed of silica, formed of calcium silicate or formed of silica and calcium silicate. In the case where the surface layer is formed of silica and calcium silicate, the calcium silicate is preferably formed between the silica layer and the calcium oxide particles.

The silica and calcium silicate may be crystalline or amorphous, but is generally preferably crystalline.

The chemical heat storage material according to the present invention preferably has a silicon equivalent content within a range 0.1 to 10% by mass, more preferably within a range of 0.3 to 7% by mass, and still more preferably within a range of 0.5 to 5% by mass. If the silicon equivalent content is too small, good cyclic durability may be less likely to be exhibited. If the silicon equivalent content is too large, an effective content of calcium oxide acting as a chemical heat storage material is small, resulting in a small amount of heat storage.

The chemical heat storage material according to the present invention preferably has a calcium atom-equivalent content within a range 56 to 71% by mass, more preferably within a range of 60 to 70.5% by mass, and still more preferably within a range of 63 to 70% by mass. If the calcium atom-equivalent content is too small, the amount of chemical heat storage may be small. If the calcium atom-equivalent content is too large, good cyclic durability may be less likely to be exhibited.

<Production Method of Chemical Heat Storage Material>

The chemical heat storage material according to the present invention can be produced by a production method including the steps of: preparing surface-treated calcium carbonate in which calcium carbonate has a coated layer serving as a source of silica on a surface thereof; and firing the surface-treated calcium carbonate to convert calcium carbonate to calcium oxide.

(Surface-Treated Calcium Carbonate)

The surface-treated calcium carbonate according to the present invention can be produced by forming a coated layer serving as a source of silica on the surface of calcium carbonate.

The coated layer can be formed by depositing a source of silica on the surface of calcium carbonate. The coated layer can be formed, for example, using at least one selected from the group consisting of silica hydrosol, silane coupling agent, silica powder, and alkoxide silane.

The silica hydrosol that can be used is one produced by any known method. For example, silica hydrosol produced by acid digestion can be used. Alternatively, amorphous silica hydrosol can be used which has been produced by adding into a sodium silicate solution an inorganic acid, such as hydrochloric acid or sulfuric acid, aluminum sulfate, an organic acid, such as acetic acid or acrylic acid, carbon dioxide or other acidic substances. Further alternatively, silica hydrosol can be used which has been produced by dialysis in which sodium silicate is passed through a semipermeable membrane. Silica hydrosol can also be used which has been produced by an ion exchange method using an ion-exchange resin.

An example of a method for treating calcium carbonate with silica hydrosol is a method of adding an aqueous solution of sodium silicate at a suitable concentration to a slurry of calcium carbonate, adding an acidic substance, such as an inorganic acid or an organic acid, dropwise to the mixture with stirring, and treating, with active silica hydrosol produced in this manner, the surface of calcium carbonate.

In the case of using previously prepared silica hydrosol, calcium carbonate can be treated by adding the silica hydrosol to a slurry of calcium carbonate and stirring them vigorously.

The slurry of calcium carbonate for use is one having a solid content concentration of 0.5 to 20% by mass, preferably about 1 to about 15% by mass. The concentration of sodium silicate in the aqueous solution for use is about 1 to about 40% by mass. The rate of the concentration of sodium silicate relative to the solid content concentration of the slurry of calcium carbonate is about 11.3% by mass to about 200% by mass.

Examples of the silane coupling agent include vinyltrichlorosilane, vinyltrimethoxysilane, vinyltriethoxysilane, vinyltris(β-methoxyethoxy)silane, β-(3,4-epoxycyclohexyl)

ethyltrimethoxysilane, γ-(2-aminoethyl)aminopropyltrimethoxysilane, γ-glycidoxypropyltrimethoxysilane, γ-glycidoxypropyltrimethyldiethoxysilane, γ-glycidoxypropyltriethoxysilane, γ-methacryloxypropylmethyldimethoxysilane, γ-methacryloxypropyltrimethoxysilane, γ-methacryloxypropylmethyldiethoxysilane, γ-methacryloxypropyltriethoxysilane, N-β(aminoethyl)γ-aminopropylmethyldimethoxysilane, N-β(aminoethyl)γ-aminopropyltrimethoxysilane, N-β(aminoethyl)γ-aminopropyltriethoxysilane, 3-aminopropyltrimethoxysilane, 3-aminopropyltriethoxysilane, N-phenyl-γ-aminopropyltrimethoxysilane, γ-chloropropyltrimethoxysilane, γ-mercaptopropyltrimethoxysilane, bis-(3-[triethoxysilyl]-propyl)-tetrasulfane (TESPT), and bis-(3-[triethoxysilyl]-propyl)-disulfane.

Particularly, γ-(2-aminoethyl)aminopropyltrimethoxysilane, 3-aminopropyltriethoxysilane, N-β(aminoethyl)γ-aminopropyltrimethoxysilane, γ-mercaptopropyltrimethoxysilane, bis-(3-[triethoxysilyl]-propyl)-tetrasulfane, and bis-(3-[triethoxysilyl]-propyl)-disulfane are preferably used.

There is no particular limitation as to the method for treating calcium carbonate with the silane coupling agent and various conventionally known surface treatment methods can be applied.

In the case where calcium carbonate to be surface treated is in dry powder form, an example of a method that can be applied is a method of adding a silane coupling agent dropwise to the calcium carbonate powder with stirring in a mixer or spraying the silane coupling agent with a spray or other means to the calcium carbonate powder with stirring in a mixer, thus depositing the silane coupling agent on the surface of calcium carbonate. In this case, after the surface treatment, calcium carbonate may be dried by the application of heat as necessary.

In the case where calcium carbonate to be surface treated is obtained in the form of a suspension, calcium carbonate surface-treated with the silane coupling agent can be obtained by surface treating calcium carbonate by introducing a water-soluble silane coupling agent into the suspension to adsorb the silane coupling agent on the surface of calcium carbonate, then separating the treated product by filtration, and drying it. In order to make the treatment uniform, a stirrer or a wet grinder, such as a bead mill or a sand mill, may be used.

The silica powder is generally wet silica or dry silica. In dry mixing the silica powder, the silica powder and calcium carbonate powder are mixed in a mixer. Alternatively, in the case where calcium carbonate is in the form of a suspension, the silica powder is mixed as it is or in the form of a suspension with calcium carbonate and the mixture is filtered and dried, thus obtaining calcium carbonate with silica powder supported on the surface thereof.

Examples of the alkoxide silane include tetramethoxysilane and tetraethoxysilane. The most common one of alkoxy groups in alkoxysilanes is an ethyl group, but a methoxy group, a propoxy group, a butoxy group or other log-chain hydrocarbon alkoxy groups may be used as the alkoxy group. Generally, alkoxide silane reacts with water to cause hydrolysis and thus forma silica phase. Therefore, when a solution of the above-described alkoxysilane is sprayed onto calcium carbonate powder, water contained in the calcium carbonate powder then causes hydrolysis, so that a silica phase can be formed on the surface of calcium carbonate.

The amount of coated layer formed is preferably set so that the chemical heat storage material according to the present invention has the above-mentioned silicon equivalent content.

The surface-treated calcium carbonate for use in the present invention is preferably obtained by forming a silica layer made of silica hydrosol on the surface of calcium carbonate and then surface treating the calcium carbonate with a silane coupling agent. The amount of silica layer in this case is, relative to 100 parts by mass of calcium carbonate, preferably within a range of 0.1 to 10 parts by mass, more preferably within a range of 0.3 to 7 parts by mass, and still more preferably within a range of 0.5 to 5 parts by mass. The amount of surface treatment with the silane coupling agent is, relative to 100 parts by mass of calcium carbonate, preferably within a range of 0.1 to 10 parts by mass, more preferably within a range of 0.2 to 7 parts by mass, and still more preferably within a range of 0.3 to 5 parts by mass.

In the surface-treated calcium carbonate for use in the present invention, after the above-described silica layer is formed on the surface of calcium carbonate, the calcium carbonate may be treated with a fatty acid and then surface-treated with the silane coupling agent.

The treatment with a fatty acid can be made, for example, using a fatty acid soap, such as a sodium salt or potassium salt of a fatty acid. For example, the surface treatment with a fatty acid can be made by previously heating an aqueous suspension of calcium carbonate having a silica layer formed thereon to 30 to 50° C., adding a fatty acid soap into the suspension, and mixing them with stirring. The rate of addition of the fatty acid soap to the aqueous suspension of calcium carbonate is about 10 to about 70% by mass and preferably about 10 to about 50% by mass.

The amount of treatment with the fatty acid is, relative to 100 parts by mass of calcium carbonate, preferably within a range of 0.1 to 5 parts by mass, more preferably within a range of 0.2 to 4 parts by mass, and still more preferably within a range of 0.3 to 3 parts by mass.

The average particle diameter of calcium carbonate before being surface-treated, i.e., as a raw material, is preferably within a range of 10 to 300 nm, more preferably within a range of 15 to 200 nm, and still more preferably within a range of 20 to 150 nm. If the average particle diameter of calcium carbonate is too small, powder may agglomerate, so that the resultant chemical heat storage material may not be able to exhibit good cyclic durability. If the average particle diameter of calcium carbonate is too large, the resultant chemical heat storage material may not be able to exhibit good cyclic durability. The average particle diameter can be determined by measuring the primary particle diameters of 1000 calcium carbonate particles by observation with a transmission electron microscope.

The BET specific surface area of calcium carbonate as a raw material is preferably within a range of 5 to 120 $m^2/g$, more preferably within a range of 10 to 100 $m^2/g$, and still more preferably within a range of 15 to 80 $m^2/g$. If the BET specific surface area of calcium carbonate is too large, powder may agglomerate, so that the resultant chemical heat storage material may not be able to exhibit good cyclic durability. If the BET specific surface area of calcium carbonate is too small, the resultant chemical heat storage material may not be able to exhibit good cyclic durability. The BET specific surface area can be calculated by detecting the amount of nitrogen gas adsorbed to calcium carbonate based on the gas adsorption method.

(Firing of Surface-Treated Calcium Carbonate)

When the surface-treated calcium carbonate produced in the above manner is fired, calcium carbonate is decarbonated to calcium oxide, so that a chemical heat storage material according to the present invention can be produced.

Any temperature during the firing will do if it enables decarbonation of calcium carbonate to calcium oxide, but the temperature is preferably within a range of 600 to 1000° C., more preferably within a range of 650 to 900° C., and still more preferably within a range of 700 to 850° C. Any time for the firing will do if it enables decarbonation of calcium carbonate to calcium oxide and the time is not particularly limited. The atmosphere for the firing will do if it enables decarbonation of calcium carbonate to calcium oxide, but the surface-treated calcium carbonate is generally fired in the air or in an inert gas, such as nitrogen or argon.

<Usable Form of Chemical Heat Storage Material>

The chemical heat storage material according to the present invention is in powder form and can be used in powder form. However, the form of the chemical heat storage material is not limited to this. For example, by preparing a paint containing the surface-treated calcium carbonate according to the present invention, applying the paint, and then firing the paint, the surface-treated calcium carbonate can be converted to a chemical heat storage material and used. Alternatively, by preparing a formed body of the surface-treated calcium carbonate according to the present invention and firing the formed body, the surface-treated calcium carbonate can be converted to a chemical heat storage material and used.

EXAMPLES

Hereinafter, a description will be given of specific examples according to the present invention, but the present invention is not limited to these examples.

Example 1

(Preparation of Surface-Treated Calcium Carbonate)

A slurry of synthetic calcium carbonate having an average particle diameter of 20 nm and a BET specific surface area of 70 m$^2$/g (solid content concentration: 8% by mass) was heated to 40° C. with vigorous stirring. Relative to 100 parts by mass of synthetic calcium carbonate in the slurry, 5 parts by mass of aqueous solution of sodium silicate was added as silica into the slurry at room temperature. Carbon dioxide was then introduced in an amount required for neutralization into the slurry, thus forming a silica layer on the surface of calcium carbonate.

Next, relative to 100 parts by mass of calcium carbonate as a raw material, 2 parts by mass of fatty acid mixture saponified by adding sodium hydroxide to a fatty acid and heating them at 90° C. with stirring was added as a fatty acid to the calcium carbonate. Then, the mixture was dewatered with a filter press and dried under a condition of 80° C. in a box dryer and the obtained dried product was ground using a micron mill grinder (Super Micron Mill manufactured by Hosokawa Micron Corporation), thus producing calcium carbonate powder surface-treated with silica and the fatty acid.

An amount of 0.5 parts by mass of 3-aminopropyltriethoxysilane, relative to 100 parts by mass of calcium carbonate as a raw material, was sprayed onto the calcium carbonate powder with stirring in a mixer and the mixture was stirred for 10 minutes and dried by the application of heat at 100° C. for 60 minutes, thus preparing surface-treated calcium carbonate.

Hereinafter, the above surface-treated calcium carbonate and a chemical heat storage material obtained by firing the surface-treated calcium carbonate are referred to as "Si-PCC 20".

(Production of Chemical Heat Storage Material)

The above surface-treated calcium carbonate was fired to convert calcium carbonate to calcium oxide, thus producing a chemical heat storage material. In this case, prior to a cyclic experiment to be described later, the surface-treated calcium carbonate was fired in a sample cell of a thermogravimetric analyzer (TG: thermogravimetric balance, TGD-9600 manufactured by ULVAC-RIKO, Inc.) for use in the cyclic experiment, thus decarbonating calcium carbonate to calcium oxide. Specifically, calcium carbonate was decarbonated by heating the surface-treated calcium carbonate to 800° C. at a rate of temperature increase of 26.5° C. min$^{-1}$ and holding the temperature for 30 minutes.

(Cyclic Experiment)

A cyclic experiment for cyclically subjecting the chemical heat storage material to hydration reaction and dehydration reaction was conducted in the sample cell of the above thermogravimetric analyzer. A platinum cell with a diameter of 7.5 mm and a height of 10 mm was used as the sample cell. A pole supporting the cell had a diameter of 1.5 mm and a length of 220 mm and a distal end portion of the pole was a connecting portion to a thermocouple. The temperature control in a reactor was performed by the thermocouple and the temperature and the weight of a reactant were measured at regular time intervals.

As for the hydration reaction, a mixed gas of argon and water vapor was supplied as a reaction gas into the reactor to give a desired vapor pressure. The time for the reaction gas to be supplied into the reactor was controlled by opening and closing a valve using a timer. In relation to the reaction gas, a specific amount of purified water was supplied into a vapor generating portion using a microdetermination pump (MINICHEMI PUMP NP-KX-105 manufactured by Nihon Seimitsu Kagaku Co., Ltd.), the generated water vapor was mixed with argon gas as a carrier gas, and the mixed gas was flowed into the reactor. Furthermore, for the purpose of avoiding failures, argon gas was continued to be delivered as a purge gas into a lower portion of the reactor.

Figure 7:
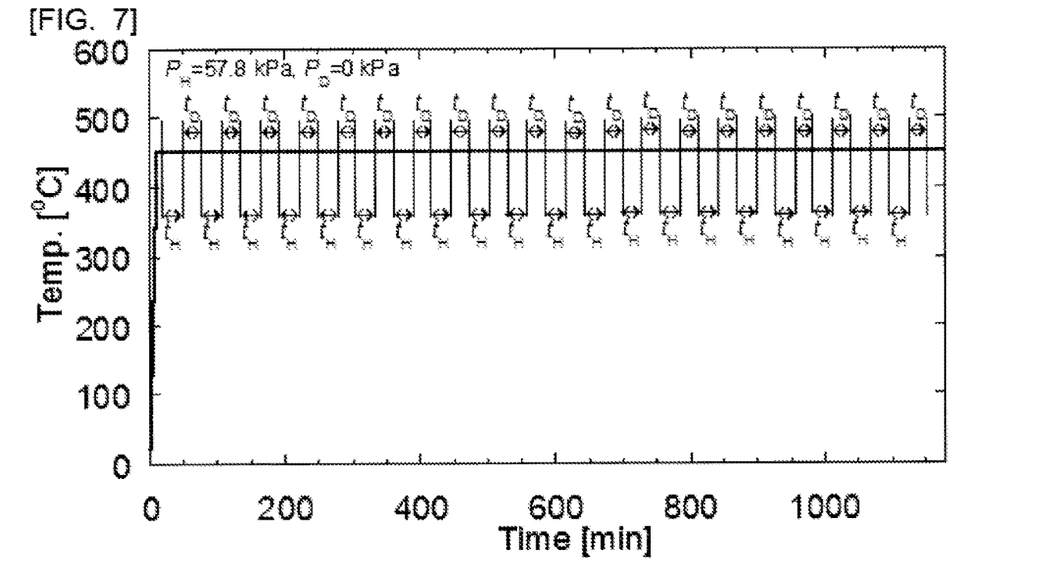
FIG. 7 is a graph showing a temperature profile in thermogravimetric analysis of performance evaluation experiments for chemical heat storage materials conducted in Example 1 and Comparative Example.

FIG. 7 shows a temperature profile in the thermogravimetric analysis. $P_H$ and $P_D$ shown in FIG. 7 represent respective water vapor pressures during hydration reaction and dehydration reaction. $t_H$ represents the time for hydration reaction (30 minutes) and $t_D$ represents the time for dehydration reaction (25 minutes). In FIG. 7, the ordinate axis represents temperature (° C.) and the abscissa axis represents time (minutes).

Note that the value 57.8 kPa is a water vapor pressure corresponding to a saturated water vapor pressure at approximately 85° C. and water vapor was supplied at this pressure to a sample portion during hydration reaction. The supply of water vapor was stopped during dehydration reaction. For the purpose of preventing failures of the thermogravimetric balance, inert argon gas was continued to be delivered in a flow rate of 100 ml min$^{-1}$ into the reactor inside the thermogravimetric balance during measurement. The temperatures and water vapor pressures during hydration reaction and dehydration reaction were as follows.

Hydration reaction: a temperature of 450° C. ($T_H$), a vapor pressure of 57.8 kPa ($P_H$)

Dehydration reaction: a temperature of 450° C. ($T_D$), a vapor pressure of 0 kPa ($P_D$)

After the chemical heat storage material was subjected to 20 repeated cycles of hydration reaction and dehydration reaction under the above conditions, its cyclic durability was evaluated.

COMPARATIVE EXAMPLE

A commercial calcium carbonate (average particle diameter: 2 to 3 μm, purity: 99.99%) was used as a comparative calcium carbonate. Using this calcium carbonate, decarbonation was performed in the same manner as in Example 1 to prepare a comparative chemical heat storage material. The comparative chemical heat storage material underwent a cyclic experiment in the same manner as in Example 1.

Hereinafter, the calcium carbonate in the comparative example and a chemical heat storage material obtained by firing the calcium carbonate in the comparative example are referred to as "CaCO$_3$ std".

<Comparison in Decarbonation Process>

Figure 8:
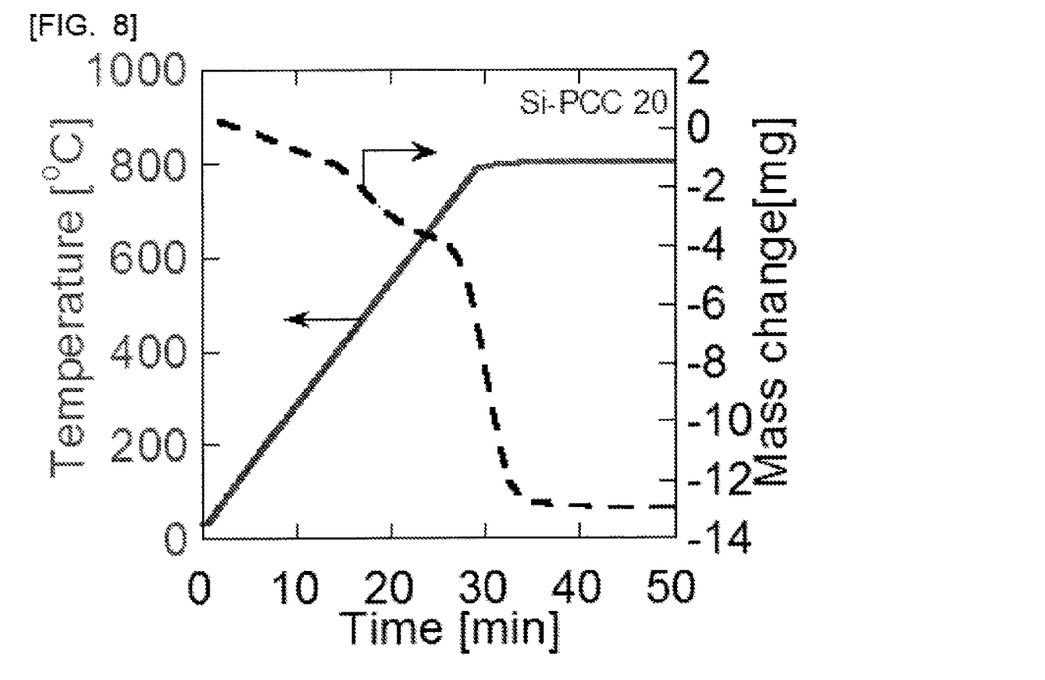
FIG. 8 is a graph showing thermogravimetric analysis data during production of the chemical heat storage material (Si-PCC 20) in Example 1 by firing surface-treated calcium carbonate in Example 1.
Figure 9:
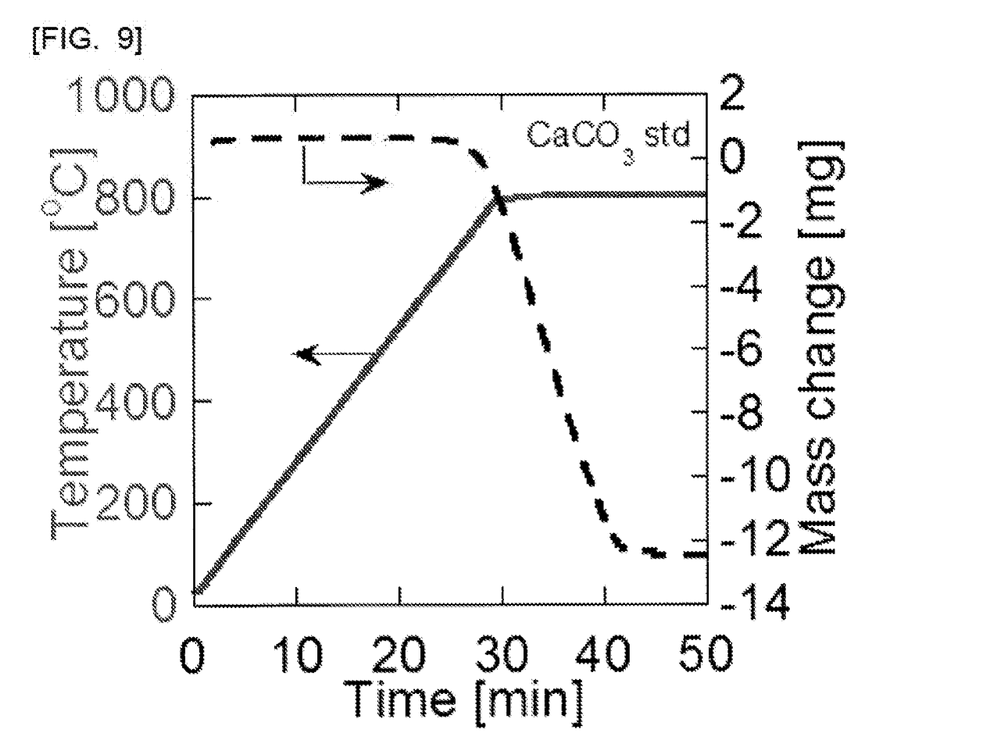
FIG. 9 is a graph showing thermogravimetric analysis data during production of the chemical heat storage material ($CaCO_3$ std) in Comparative Example by firing calcium carbonate in Comparative Example.

FIG. 8 is a graph showing thermogravimetric analysis data during production of the chemical heat storage material (Si-PCC 20) in Example 1 by firing the surface-treated calcium carbonate in Example 1 to decarbonate calcium carbonate. FIG. 9 is a graph showing thermogravimetric analysis data during production of the chemical heat storage material (CaCO$_3$ std) in Comparative Example by firing the calcium carbonate in Comparative Example to decarbonate it. In FIGS. 8 and 9, the left ordinate axis represents temperature (° C.), the right ordinate axis represents mass change (mg), and the abscissa axis represents time (minutes).

As shown in FIG. 9, the calcium carbonate in Comparative Example was found to have caused a mass reduction due to decarbonation of calcium carbonate at approximately 750° C. Unlike the above, as shown in FIG. 8, the surface-treated calcium carbonate in Example 1 was found to have caused a mass reduction in two steps. The first mass reduction was found from approximately 400 to 600° C., which can be attributed to the decomposition of the silane coupling agent and a change in silica. The second mass reduction can be attributed to the decarbonation of calcium carbonate, like the calcium carbonate in Comparative Example.

<Comparison in Cyclic Experiment>

Figure 10:
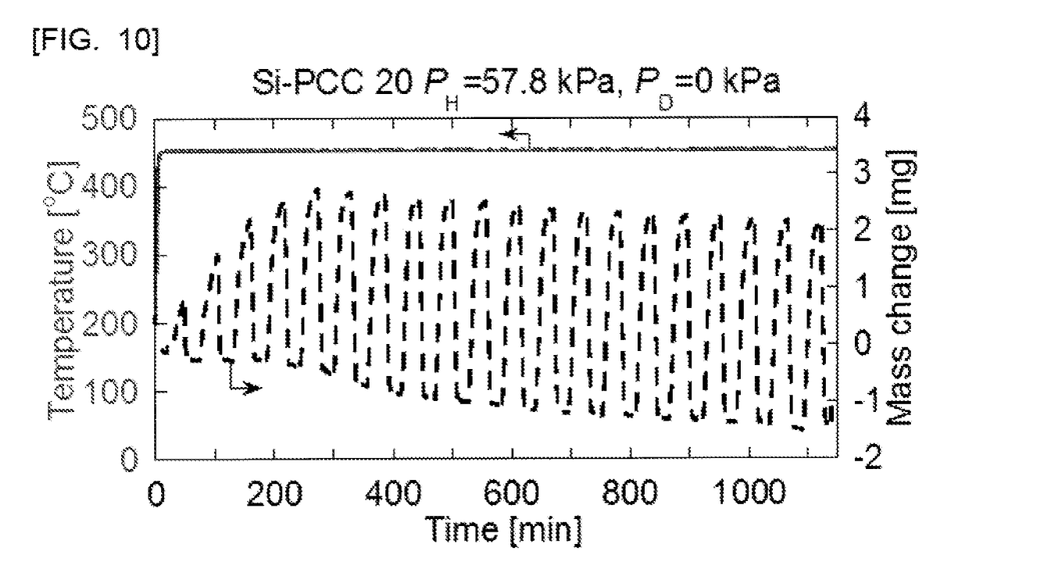
FIG. 10 is a graph showing temperature changes and mass changes of the chemical heat storage material (Si-PCC 20) in Example 1 when it was undergoing the cyclic experiment consisting of 20 cycles.
Figure 11:
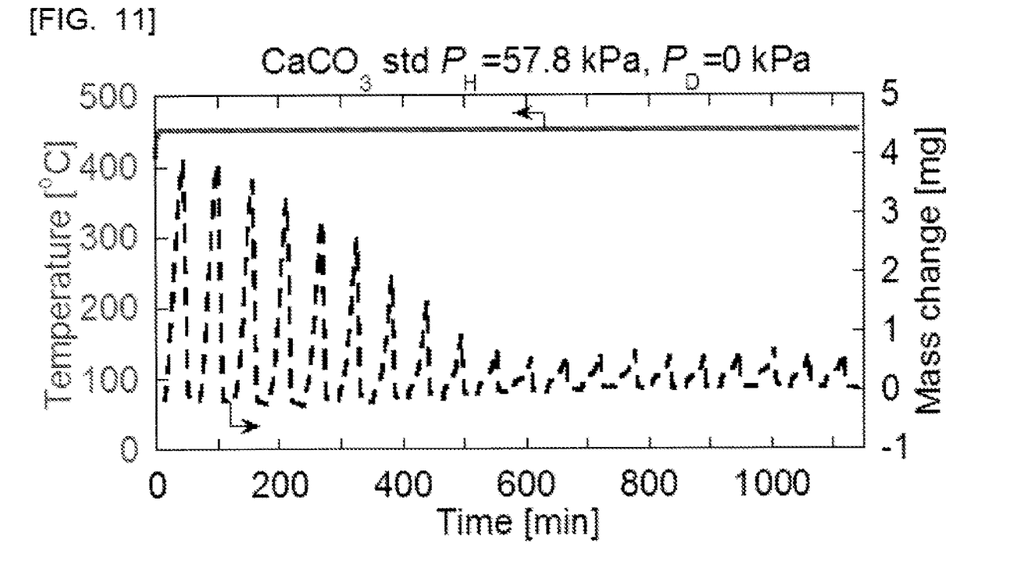
FIG. 11 is a graph showing temperature changes and mass changes of the chemical heat storage material (CaCO₃ std) in Comparative Example when it was undergoing the cyclic experiment consisting of 20 cycles.

FIG. 10 is a graph showing temperature changes and mass changes when the chemical heat storage material (Si-PCC 20) in Example 1 underwent the cyclic experiment consisting of 20 cycles. FIG. 11 is a graph showing temperature changes and mass changes when the chemical heat storage material (CaCO$_3$ std) in Comparative Example underwent the cyclic experiment consisting of 20 cycles. In FIGS. 10 and 11, the left ordinate axis represents temperature (° C.), the right ordinate axis represents mass change (mg), and the abscissa axis represents time (minutes).

Figure 12:
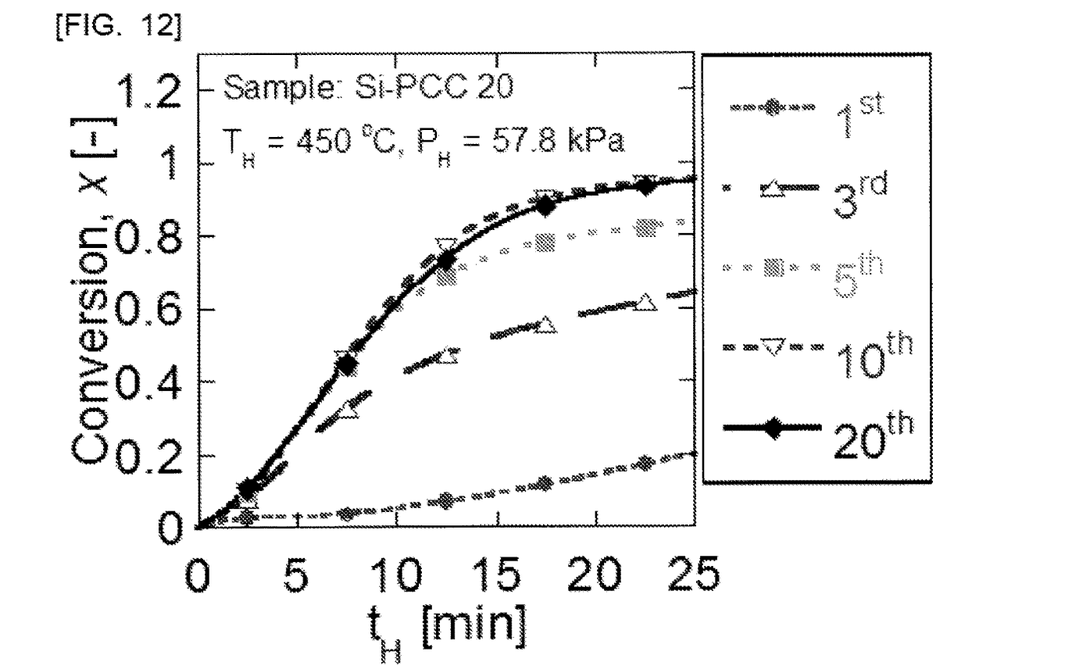
FIG. 12 is a graph showing changes in conversion with time of the chemical heat storage material (Si-PCC 20) in Example 1 during hydration reaction in the first, third, fifth, tenth, and twentieth cycles.
Figure 13:
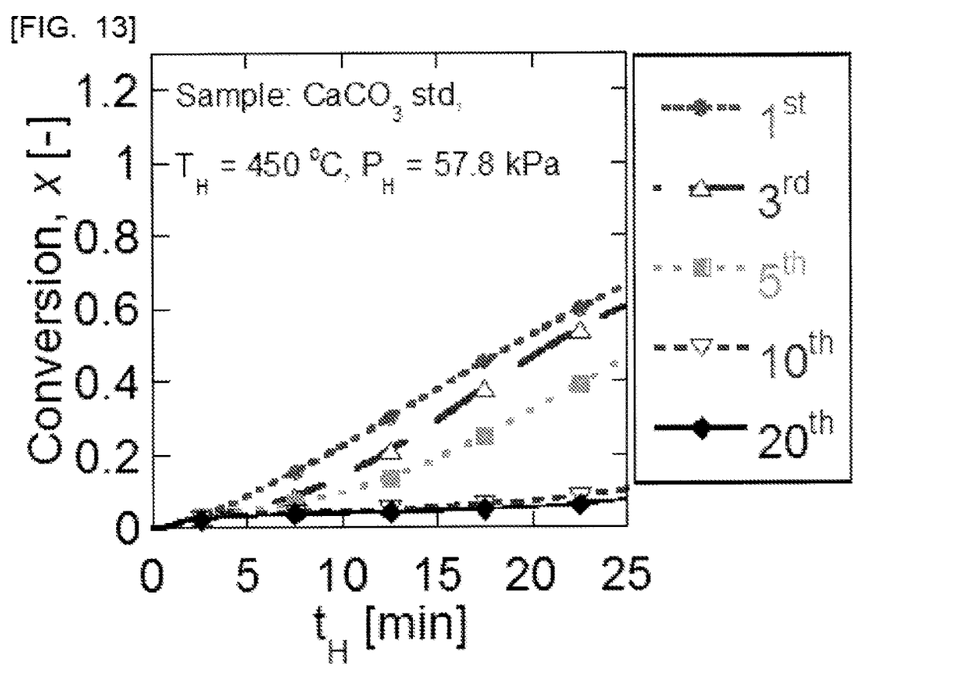
FIG. 13 is a graph showing changes in conversion with time of the chemical heat storage material (CaCO₃ std) in Comparative Example during hydration reaction in the first, third, fifth, tenth, and twentieth cycles.

FIG. 12 is a graph showing changes in conversion x with time of the chemical heat storage material (Si-PCC 20) in Example 1 during hydration reaction in the first, third, fifth, tenth, and twentieth cycles. FIG. 13 is a graph showing changes in conversion x with time of the chemical heat storage material (CaCO$_3$ std) in Comparative Example during hydration reaction in the first, third, fifth, tenth, and twentieth cycles. In FIGS. 12 and 13, the ordinate axis represents conversion x (–) and the abscissa axis represents time for hydration reaction t$_H$ (minutes).

The conversion x can be calculated from the following equation.

$$x = \frac{\Delta m / M_{H_2O}}{m_{CaO}/M_{CaO}} \quad [\text{Math. 1}]$$

$\Delta m$: mass change seen during hydration reaction [g]
$m_{CaO}$: mass of CaO determined to have been contained in sample (from calculation) [g]
$M_{H_2O}$: molar mass of H$_2$O [g mol$^{-1}$]
$M_{CaO}$: molar mass of CaO [g mol$^{-1}$]

$m_{CaO}$ can be calculated from the following equation.

$$m_{CaO} = \frac{m_{CO_2}}{M_{CO_2}} M_{CaO} \quad [\text{Math. 2}]$$

$m_{CO2}$: mass of CO$_2$ produced by decomposition of calcium carbonate as a reaction precursor [g]
$M_{CO2}$: molar mass of CO$_2$ [g mol$^{-1}$]

As shown in FIGS. 11 and 13, it can be seen that, in the chemical heat storage material (CaCO$_3$ std) in Comparative Example, the mass change gradually reduced every cycle from the first to tenth cycles and slight mass changes were exhibited in the subsequent cycles until the twentieth cycle.

In contrast, as shown in FIGS. 10 and 12, it can be seen that, in the chemical heat storage material (Si-PCC 20) in Example 1, the mass change increased every cycle from the first to tenth cycles and was maintained at a constant large value in the subsequent cycles until the twentieth cycle.

Figure 14:
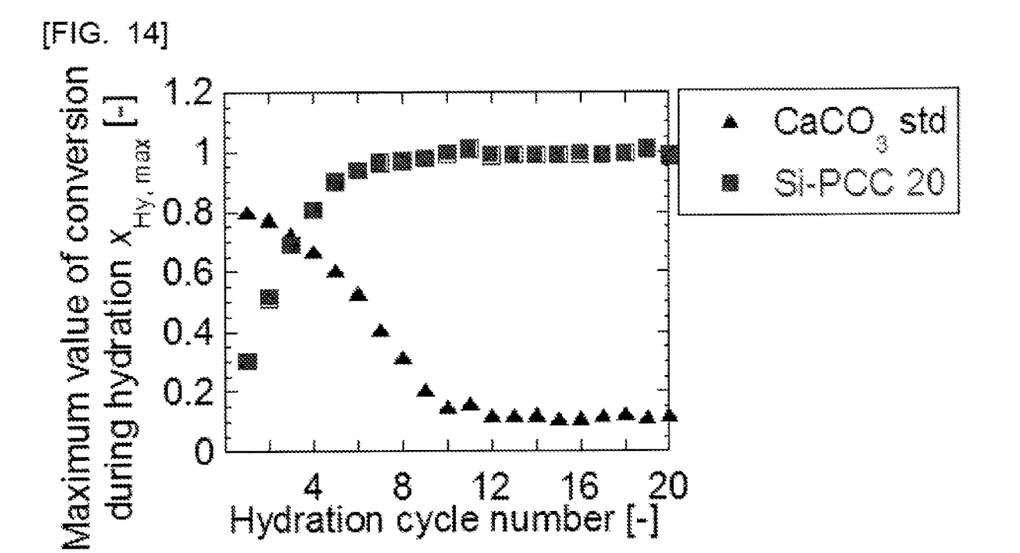
FIG. 14 is a graph showing the maximum conversions ($x_{Hy,max}$) of the chemical heat storage material (Si-PCC 20) in Example 1 and the chemical heat storage material (CaCO₃ std) in Comparative Example during hydration reaction in each cycle of the cyclic experiment consisting of 20 cycles.
Figure 15:
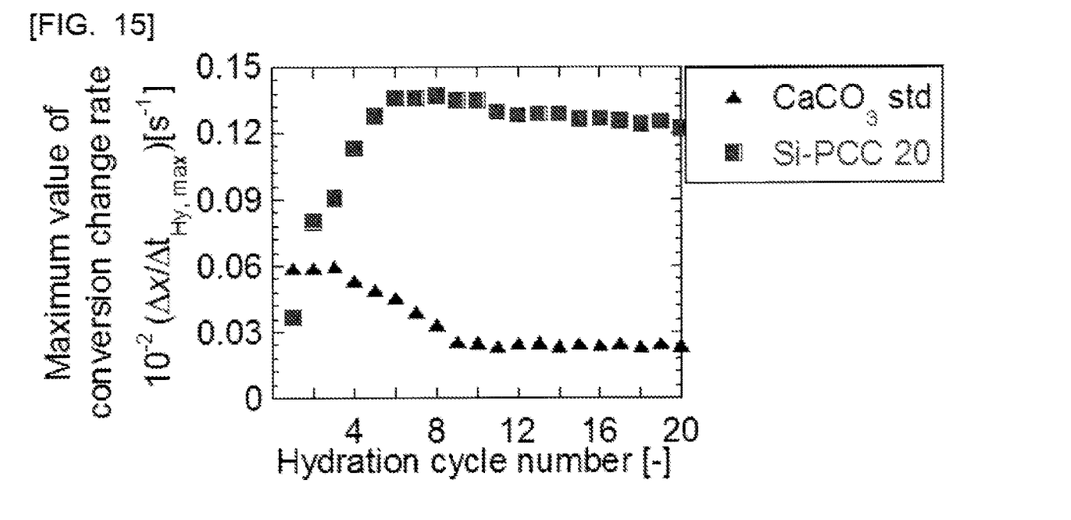
FIG. 15 is a graph showing the maximum conversion change rates (($\Delta x/\Delta t)_{Hy,max}$) of the chemical heat storage material (Si-PCC 20) in Example 1 and the chemical heat storage material (CaCO₃ std) in Comparative Example during hydration reaction in each cycle of the cyclic experiment consisting of 20 cycles.

FIG. 14 is a graph showing the maximum conversions ($x_{Hy,max}$) of the chemical heat storage material (Si-PCC 20) in Example 1 and the chemical heat storage material (CaCO$_3$ std) in Comparative Example during hydration reaction in each cycle of the cyclic experiment consisting of 20 cycles. FIG. 15 is a graph showing the maximum conversion change rates (($\Delta x/\Delta t$)$_{Hy,max}$) of the chemical heat storage material (Si-PCC 20) in Example 1 and the chemical heat storage material (CaCO$_3$ std) in Comparative Example during hydration reaction in each cycle of the cyclic experiment consisting of 20 cycles. In FIG. 14, the ordinate axis represents maximum conversion $x_{Hy,max}$(–) during hydration reaction and the abscissa axis represents the number of cycles of hydration reaction (–). In FIG. 15, the ordinate axis represents maximum conversion change rate ($\Delta x/\Delta t$)$_{Hy,max}$ (S$^{-1}$) during hydration reaction and the abscissa axis represents the number of cycles of hydration reaction (–).

The maximum conversion change rate (($\Delta x/\Delta t$)$_{Hy,max}$) is defined by the following equation. This can be derived from a change in conversion x with time for 24 seconds.

$$\frac{\Delta x}{\Delta t} = \frac{x_{(t+12)} - x_{(t-12)}}{24} \quad [\text{Math. 3}]$$

$\Delta x/\Delta t$: conversion change rate [S$^{-1}$]
$x_{(t)}$: conversion at a certain point of time t [–]

As shown in FIG. 14, the maximum conversion ($x_{Hy,max}$) of the chemical heat storage material (Si-PCC 20) in Example 1 increased for the first eight cycles and then reached approximately 1.0. On the other hand, the maximum conversion of the chemical heat storage material (CaCO$_3$ std) in Comparative Example gradually decreased for the first nine cycles and then reached below 0.2. The maximum conversion ($x_{Hy,max}$) of the chemical heat storage material (Si-PCC 20) in Example 1 in the twentieth cycle was 0.99, whereas the maximum conversion ($x_{Hy,max}$) of the chemical heat storage material (CaCO$_3$ std) in Comparative Example in the twentieth cycle was 0.12.

As shown in FIG. 15, the maximum conversion change rate (($\Delta x/\Delta t$)$_{Hy,max}$) of the chemical heat storage material (Si-PCC 20) in Example 1 was higher than that of the chemical heat storage material (CaCO$_3$ std) in Comparative Example except for the first cycle. Furthermore, the maximum conversion change rate (($\Delta x/\Delta t$)$_{Hy,max}$) of the chemical heat storage material (Si-PCC 20) in Example 1 was maintained at high values in the sixth and later cycles. The maximum conversion change rate $((\Delta x/\Delta t)_{Hy,max})$ of the chemical heat storage material (Si-PCC 20) in Example 1 in the twentieth cycle was $12.2 \times 10^{-2}$ S$^{-1}$, which shows a value five times larger than the maximum conversion change rate $((\Delta x/\Delta t)_{Hy,max})$, $2.4 \times 10^{-2}$ S$^{-1}$, of the chemical heat storage material (CaCO$_3$ std) in Comparative Example in the twentieth cycle.

<X-Ray Diffraction Pattern>

Figure 16:
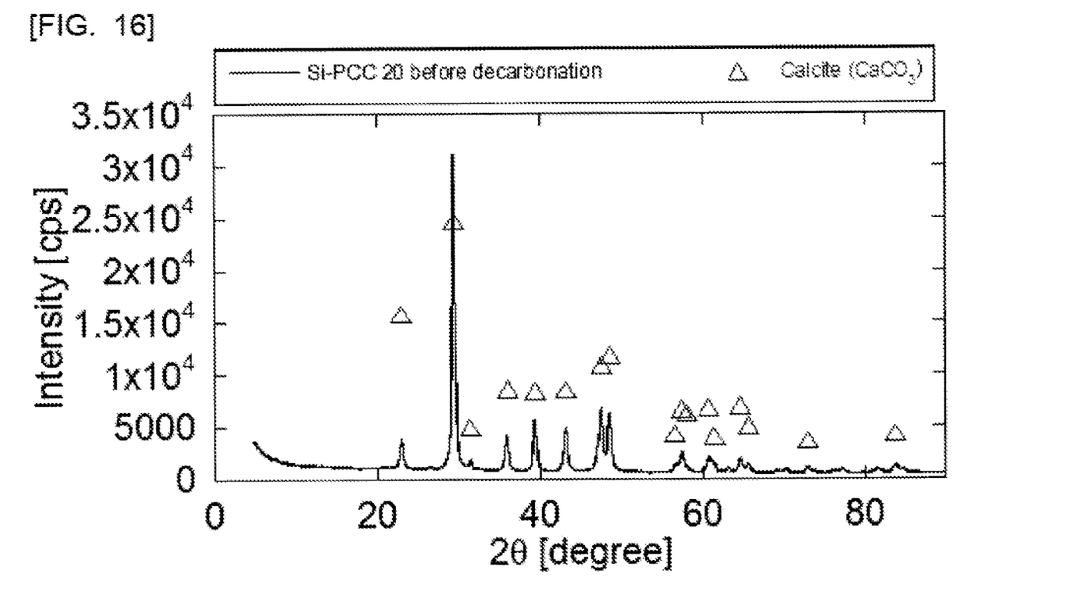
FIG. 16 is a graph showing an X-ray diffraction pattern of the surface-treated calcium carbonate in Example 1.
Figure 17:
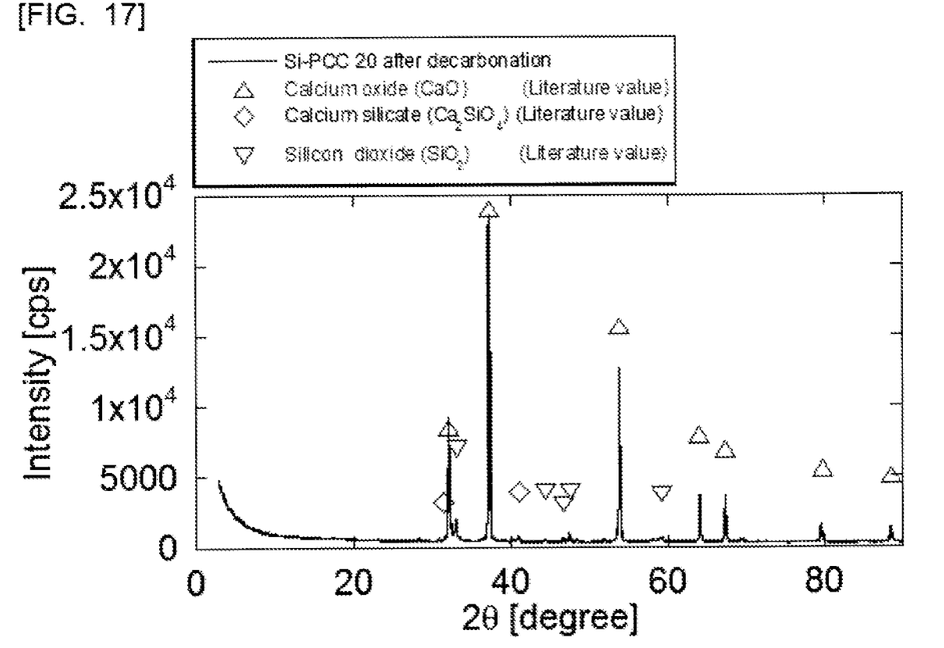
FIG. 17 is a graph showing an X-ray diffraction pattern of the chemical heat storage material (Si-PCC 20) in Example 1.

FIG. 16 is a graph showing an X-ray diffraction pattern of the surface-treated calcium carbonate in Example 1. FIG. 17 is a graph showing an X-ray diffraction pattern of the chemical heat storage material (Si-PCC 20) in Example 1. In FIGS. 16 and 17, the ordinate axis represents intensity (cps) and the abscissa axis represents 2θ (degrees).

As shown in FIG. 16, in the X-ray diffraction pattern of the surface-treated calcium carbonate in Example 1, only peaks due to calcite, which is calcium carbonate, were found and substantially no peaks due to silica, fatty acid, and silane coupling agent forming the coated layer were found.

Unlike the above, as shown in FIG. 17, in the X-ray diffraction pattern of the chemical heat storage material (Si-PCC 20) in Example 1 after the decarbonation, peaks due to calcium oxide (CaO), silicon dioxide (SiO$_2$), and calcium silicate (Ca$_2$SiO$_4$) were detected. Silicon dioxide (crystalline silica) and calcium silicate can be considered to have been produced by conversion of amorphous silica and the silane coupling agent both forming the coated layer of the surface-treated calcium carbonate due to the thermal treatment for decarbonation. Calcium silicate can be considered to have been produced by reaction of amorphous silica and/or the silane coupling agent with calcium oxide converted from calcium carbonate. Therefore, calcium silicate can be considered to be present in the vicinity of calcium oxide.

From the above, it can be seen that the chemical heat storage material (Si-PCC 20) in Example 1 are calcium oxide particles having a surface layer formed of silica (silicon dioxide) and calcium silicate. Furthermore, it can be seen that since the chemical heat storage material has a surface layer formed of silica and/or calcium silicate, the surface layer ensures a passage of water vapor during hydration reaction and can prevent diffusion of atoms in repeated cycles of hydration reaction and dehydration reaction to prevent agglomeration of calcium oxide particles.

<Observation with Electron Microscope>

Figure 1:
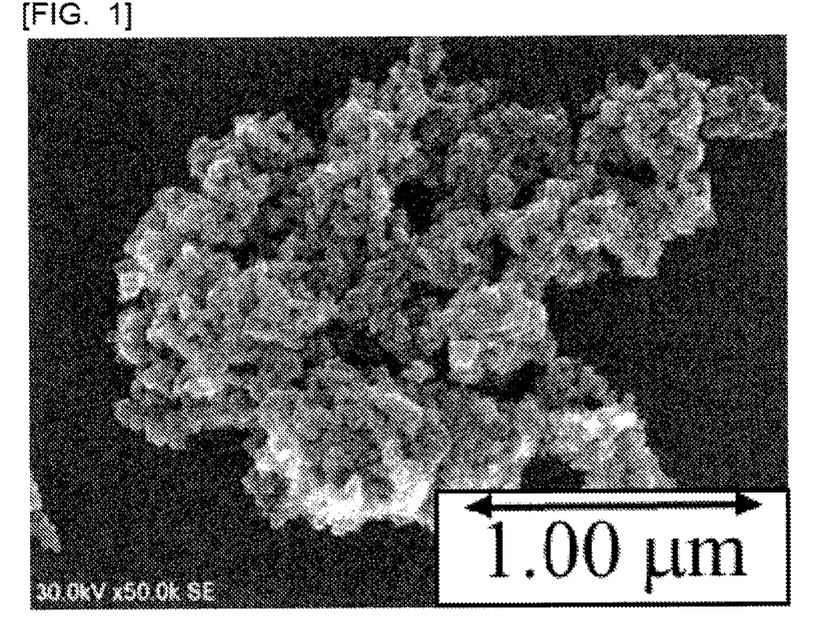
FIG. 1 is a scanning electron micrograph (at 50000-fold magnification) showing surface-treated calcium carbonate in Example 1 of the present invention.
Figure 2:
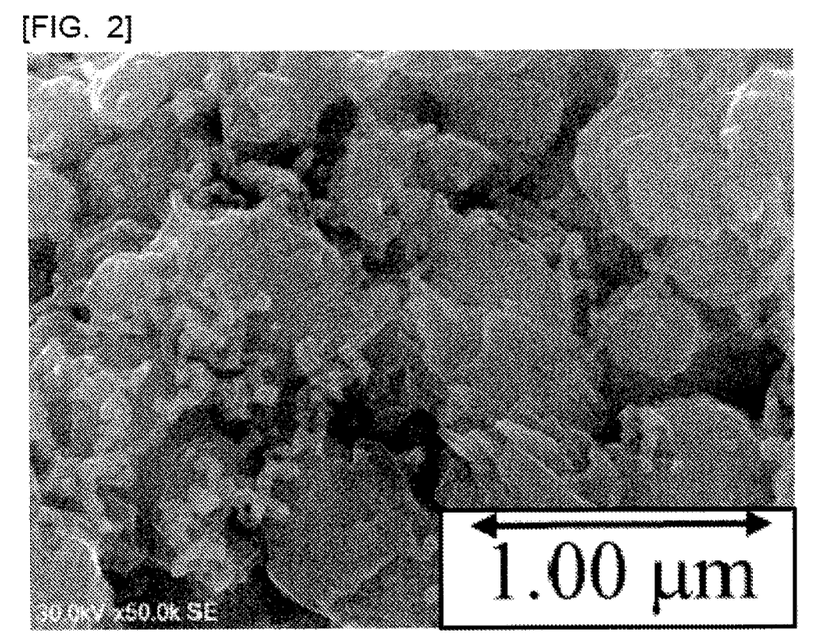
FIG. 2 is a scanning electron micrograph (at 50000-fold magnification) showing a chemical heat storage material (Si-PCC 20) in Example 1 obtained by firing the surface-treated calcium carbonate shown in FIG. 1.
Figure 3:
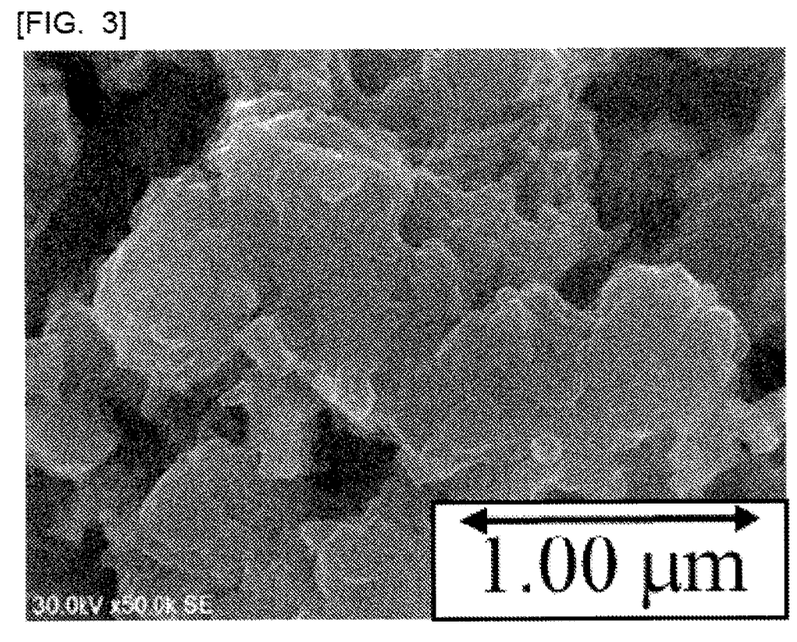
FIG. 3 is a scanning electron micrograph (at 50000-fold magnification) showing a state of the chemical heat storage material (Si-PCC 20) in Example 1 shown in FIG. 2 after undergoing a cyclic experiment consisting of 20 cycles.

FIG. 1 is a scanning electron micrograph (at 50000-fold magnification) showing the surface-treated calcium carbonate in Example 1. FIG. 2 is a scanning electron micrograph (at 50000-fold magnification) showing a chemical heat storage material (Si-PCC 20) in Example 1 obtained by firing the surface-treated calcium carbonate shown in FIG. 1. FIG. 3 is a scanning electron micrograph (at 50000-fold magnification) showing a state of the chemical heat storage material (Si-PCC 20) in Example 1 shown in FIG. 2 after undergoing the cyclic experiment consisting of 20 cycles.

Figure 4:
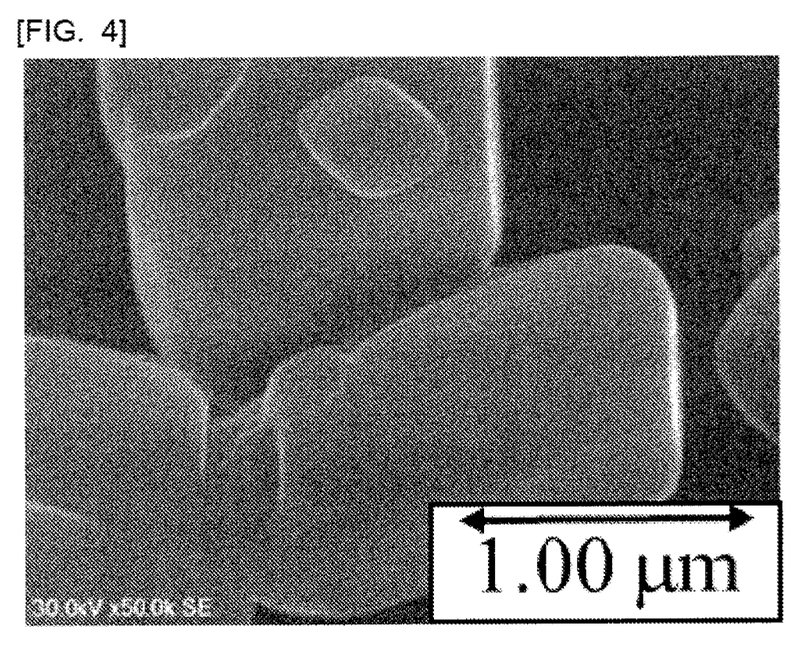
FIG. 4 is a scanning electron micrograph (at 50000-fold magnification) showing calcium carbonate in Comparative Example.
Figure 5:
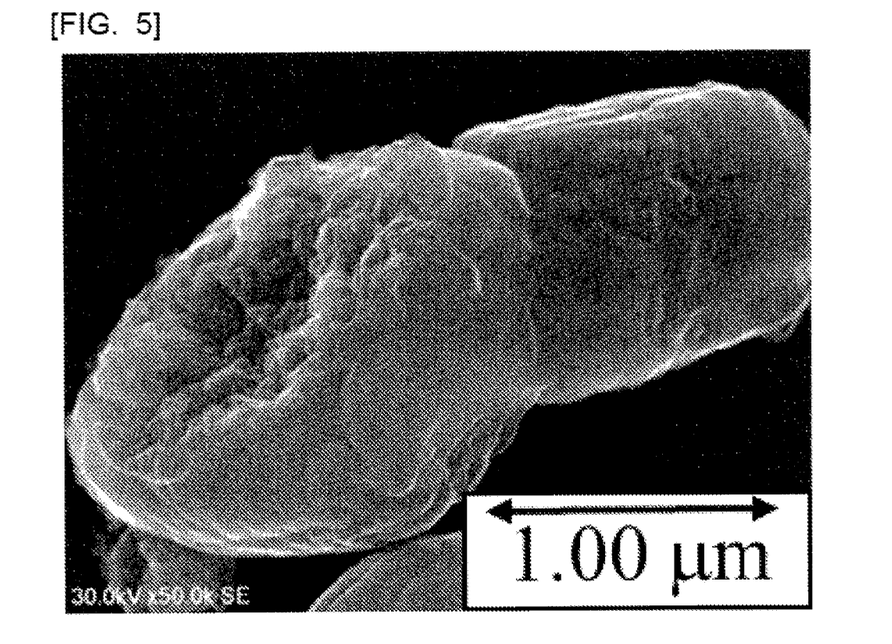
FIG. 5 is a scanning electron micrograph (at 50000-fold magnification) showing a chemical heat storage material ($CaCO_3$ std) in Comparative Example obtained by firing calcium carbonate in Comparative Example shown in FIG. 4.
Figure 6:
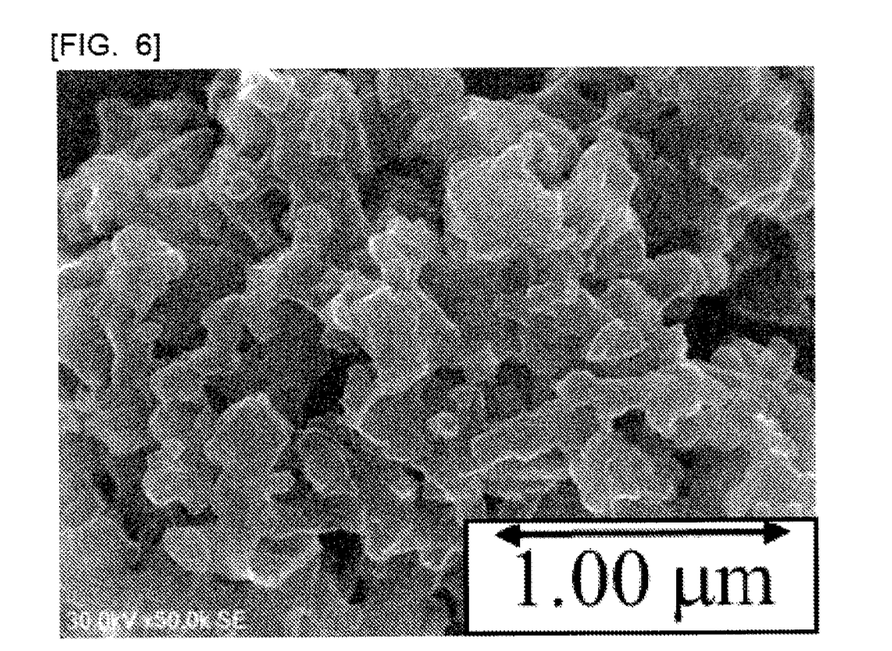
FIG. 6 is a scanning electron micrograph (at 50000-fold magnification) showing a state of the chemical heat storage material ($CaCO_3$ std) in Comparative Example shown in FIG. 5 after undergoing a cyclic experiment consisting of 20 cycles.

FIG. 4 is a scanning electron micrograph (at 50000-fold magnification) showing the calcium carbonate in Comparative Example. FIG. 5 is a scanning electron micrograph (at 50000-fold magnification) showing a chemical heat storage material (CaCO$_3$ std) in Comparative Example obtained by firing the calcium carbonate in Comparative Example shown in FIG. 4. FIG. 6 is a scanning electron micrograph (at 50000-fold magnification) showing a state of the chemical heat storage material (CaCO$_3$ std) in Comparative Example shown in FIG. 5 after undergoing the cyclic experiment consisting of 20 cycles.

As shown in FIG. 4, the calcium carbonate in Comparative Example was cubic and its average particle diameter was approximately 10 μm. As shown in FIG. 5, the particles of the chemical heat storage material (CaCO$_3$ std) in Comparative Example were contracted by decarbonation because of a difference between the specific volume (0.37 cm$^3 \cdot$g$^{-1}$) of calcium carbonate and the specific volume (0.29 cm$^3 \cdot$g$^{-1}$) of calcium oxide and thus had wrinkled surfaces. As shown in FIG. 6, in the chemical heat storage material (CaCO$_3$ std) in Comparative Example, the particles were finely powdered to increase the bulk density and thus decrease the diffusivity of water vapor. As a result, the particles were found to agglomerate.

On the other hand, as shown in FIG. 1, the surface-treated calcium carbonate in Example 1 was in the form of fine particles, the average particle diameter was approximately 20 nm, and the boundaries between particles could be clearly recognized. As shown in FIG. 2, the particles were bonded together by decarbonation, but their contraction was not observed and the surface of the chemical heat storage material (Si-PCC 20) in Example 1 was rougher than that of the chemical heat storage material (CaCO$_3$ std) in Comparative Example. As shown in FIG. 3, after the cyclic experiment, the particle shapes of the chemical heat storage material (Si-PCC 20) in Example 1 were maintained and agglomeration was not observed. It can be considered that since the chemical heat storage material (Si-PCC 20) in Example 1 had a surface layer formed of silica and/or calcium silicate, its activity of hydration reaction was increased.

As can be seen from the above, the chemical heat storage material according to the present invention has excellent cyclic durability. This can be attributed to the fact that since the chemical heat storage material has a surface layer formed of silica and/or calcium silicate, agglomeration of calcium oxide particles is prevented, so that the diffusivity of water vapor in repeated cycles is increased.

Example 2

Surface-treated calcium carbonate was prepared in the same manner as in Example 1 and decarbonated in the same manner as in Example 1, thus producing a chemical heat storage material in Example 2. The chemical heat storage material in Example 2 underwent a cyclic experiment consisting of 100 cycles under the same conditions as in Example 1 except that the time for hydration reaction was 30 minutes and the time for dehydration reaction was 26.5 minutes.

Figure 20:
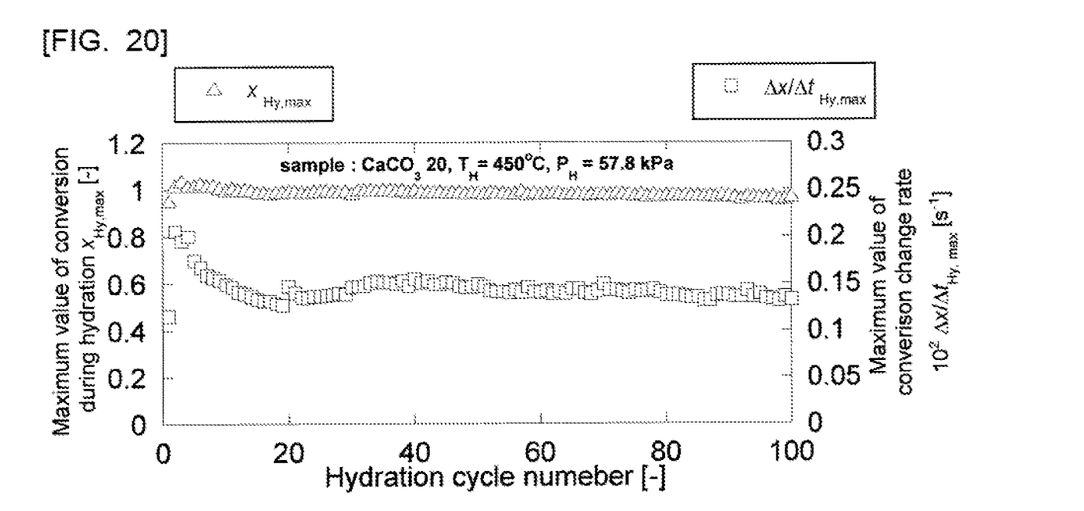
FIG. 20 is a graph showing the maximum conversions (xHy, max) and the maximum conversion change rates (($\Delta x/\Delta t)_{Hy,max}$) of the chemical heat storage material in Example 2 during hydration reaction in each cycle of the cyclic experiment consisting of 100 cycles.

FIG. 20 is a graph showing the maximum conversions $(x_{Hy,max})$ and the maximum conversion change rates $((\Delta x/\Delta t)_{Hy,max})$ of the chemical heat storage material in Example 2 during hydration reaction in each cycle of the cyclic experiment consisting of 100 cycles. In FIG. 20, the left ordinate axis represents maximum conversion $x_{Hy,max}$ (−) during hydration reaction, the right ordinate axis represents maximum conversion change rate $(\Delta x/\Delta t)_{Hy,max}$ (S$^{-1}$) during hydration reaction, and the abscissa axis represents the number of cycles of hydration reaction (−).

As shown in FIG. 20, the maximum conversion $(x_{Hy,max})$ remained around 1 in substantially all cycles except for the first two cycles. It was confirmed that the maximum conversion change rate $((\Delta x/\Delta t)_{Hy,max})$ exhibited high values of about $0.2 \times 10^{-2}$ [s$^{-1}$] from the third to fifth cycles, but then converged to about $0.13 \times 10^{-2}$ [s$^{-1}$] from the twentieth to hundredth cycles.

As can be seen from the above, the chemical heat storage material according to the present invention has excellent cyclic durability even after undergoing the cyclic experiment consisting of 100 cycles.

<Observation with Electron Microscope>

Figure 18:
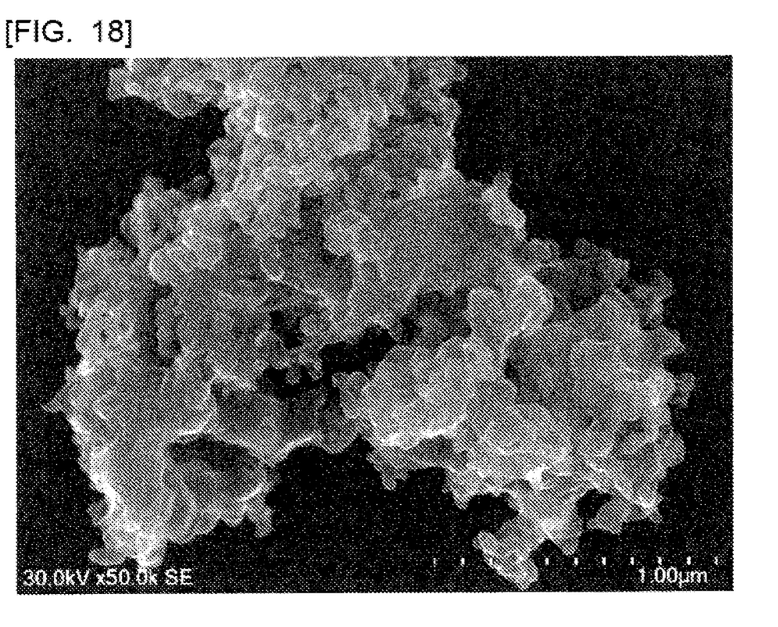
FIG. 18 is a scanning electron micrograph (at 50000-fold magnification) showing a state of a chemical heat storage material in Example 2 according to the present invention after undergoing a cyclic experiment consisting of 100 cycles.
Figure 19:
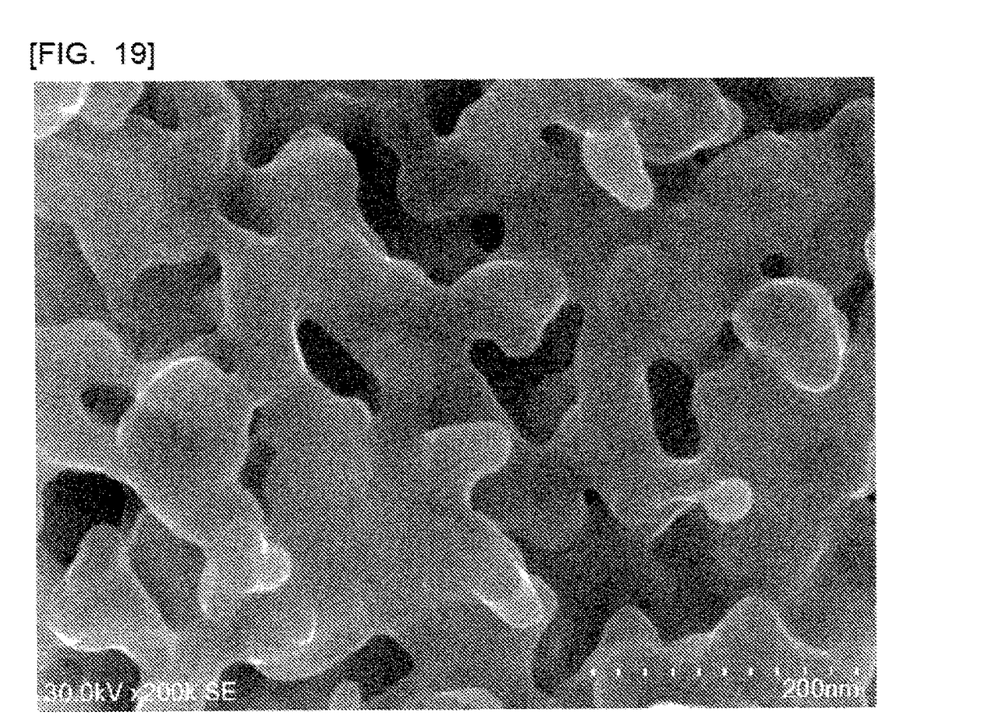
FIG. 19 is a scanning electron micrograph (at 200000-fold magnification) showing a state of the chemical heat storage material in Example 2 after undergoing the cyclic experiment consisting of 100 cycles.

FIG. 18 is a scanning electron micrograph (at 50000-fold magnification) showing a state of the chemical heat storage material in Example 2 according to the present invention after undergoing the cyclic experiment consisting of 100 cycles. FIG. 19 is a scanning electron micrograph (at 200000-fold magnification) showing a state of the chemical heat storage material in Example 2 after undergoing the cyclic experiment consisting of 100 cycles.

As shown in FIGS. 18 and 19, agglomeration of the particles of the chemical heat storage material in Example 2 was not observed even after the cyclic experiment consisting of 100 cycles. It can be considered from this that a high activity of hydration reaction was maintained.

The invention claimed is:

1. A chemical heat storage material comprising: a surface layer formed of silica and calcium silicate; and
   calcium oxide particles with the surface layer;
   and having a silicon content of 0.1 to 10% by mass and a calcium content of 56 to 71% by mass,
   wherein the calcium silicate is formed between the silica and the calcium oxide particles, and is configured such that a passage of water vapor during hydration reaction of the calcium oxide particles for heat generation and during dehydration reaction of the hydrated calcium oxide particles for heat storage is formed in the surface layer.

2. A method for producing the chemical heat storage material according to claim 1, the method comprising the steps of: preparing surface-treated calcium carbonate in which calcium carbonate has a coated layer serving as a source of silica on a surface thereof; and firing the surface-treated calcium carbonate to convert calcium carbonate to calcium oxide.

3. The method for producing a chemical heat storage material according to claim 2, wherein the coated layer is formed using at least one selected from the group consisting of silica hydrosol, silane coupling agent, silica powder, and alkoxide silane.

4. The method for producing a chemical heat storage material according to claim 2, wherein the calcium carbonate before being surface-treated has an average particle diameter within a range of 10 to 300 nm.

5. The method for producing a chemical heat storage material according to claim 2, wherein the calcium carbonate before being surface-treated has a BET specific surface area within a range of 5 to 120 $m^2/g$.

6. The method for producing a chemical heat storage material according to claim 2, wherein a temperature during the firing is within a range of 600 to 1000° C.

7. A method for producing the chemical heat storage material according to claim 1, the method comprising the steps of:
   forming a silica layer made of silica hydrosol on a surface of calcium carbonate;
   surface-treating with a fatty acid the calcium carbonate having the silica layer to prepare a surface-treated calcium carbonate; and
   firing the surface-treated calcium carbonate to convert calcium carbonate to calcium oxide.

8. The method for producing a chemical heat storage material according to claim 7, wherein the surface-treated calcium carbonate is surface-treated with a silane coupling agent after surface-treating with the fatty acid.

9. The method for producing a chemical heat storage material according to claim 7, wherein the calcium carbonate before being surface-treated has an average particle diameter within a range of 10 to 300 nm.

10. The method for producing a chemical heat storage material according to claim 7, wherein the calcium carbonate before being surface-treated has a BET specific surface area within a range of 5 to 120 $m^2/g$.

11. The method for producing a chemical heat storage material according to claim 7, wherein a temperature during the firing is within a range of 600 to 1000° C.

12. The method for producing a chemical heat storage material according to claim 7, wherein calcium silicate is formed between the silica layer and the calcium oxide.

* * * * *